(12) United States Patent
Ko et al.

(10) Patent No.: US 8,189,122 B2
(45) Date of Patent: May 29, 2012

(54) METHOD AND SYSTEM FOR AUTOMATIC COLOR WHEEL CALIBRATION IN A PROJECTOR

(75) Inventors: Chueh-Pin Ko, Taipei Hsien (TW); Chen-Kang Su, Taipei Hsien (TW)

(73) Assignee: Acer Incorporated, Taipei Hsien (TW)

( * ) Notice: Subject to any disclaimer, the term of this patent is extended or adjusted under 35 U.S.C. 154(b) by 682 days.

(21) Appl. No.: 12/366,097

(22) Filed: Feb. 5, 2009

(65) Prior Publication Data

US 2010/0053338 A1   Mar. 4, 2010

(30) Foreign Application Priority Data

Aug. 27, 2008   (TW) .............................. 97132754 A

(51) Int. Cl.
*H04N 9/12* (2006.01)
(52) U.S. Cl. .................. 348/743; 348/191; 348/771
(58) Field of Classification Search .................. 348/743, 348/742, 771, 658, 191, 181
See application file for complete search history.

(56) References Cited

U.S. PATENT DOCUMENTS

| | | | |
|---|---|---|---|
| 7,586,703 B2 * | 9/2009 | Thollot et al. ................ | 359/889 |
| 2005/0068464 A1 * | 3/2005 | Pettitt et al. ................... | 348/690 |
| 2007/0058088 A1 * | 3/2007 | Schubert et al. .............. | 348/743 |

* cited by examiner

*Primary Examiner* — Michael Lee
(74) *Attorney, Agent, or Firm* — Pearne & Gordon LLP

(57) ABSTRACT

In a method for automatic color wheel calibration in a projector, the color wheel includes three primary colors and a non-primary color. The method includes: enabling the projector to project the non-primary color, and measuring first optical physical amounts of the projected non-primary color; enabling the projector to project a combination color of the three primary colors having respective color level values, measuring second optical physical amounts of the projected combination color, and adjusting the respective color level values of the three primary colors according to respective values of differences between the first optical physical amounts and the second optical physical amounts; and repeating the above steps until each of the values of differences approximates zero, thereby obtaining color level values for the three primary colors to produce a combination color matching the non-primary color.

10 Claims, 3 Drawing Sheets

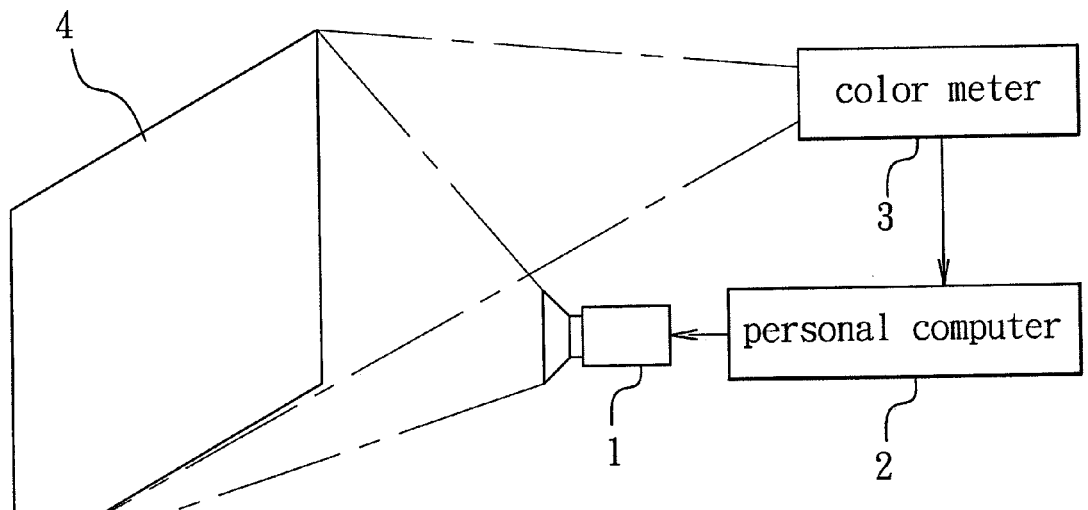
F I G. 2

METHOD AND SYSTEM FOR AUTOMATIC COLOR WHEEL CALIBRATION IN A PROJECTOR

CROSS-REFERENCE TO RELATED APPLICATION

This application claims priority to Taiwanese Application No. 097132754, filed Aug. 27, 2008, the disclosure of which is incorporated herein by reference.

BACKGROUND OF THE INVENTION

1. Field of the Invention

The invention relates to a method for calibrating a projector, more particularly to a method and system for automatic color wheel calibration in a projector.

2. Description of the Related Art

Digital light processing (DLP) projectors using a single digital micro-mirror device (DMD) chip are the more commonly used types of projectors currently available on the market. Such DLP projectors require use of a color wheel to separate colors, and the colors required by each pixel are reflected to a display screen using the DMD chip. However, since the color wheel of the conventional projector that uses a single DMD chip can only process one color at a time, loss of some of the luminance may result. In addition, since the spectral wavelength characteristics of different colored lights may vary, the colors cannot be truly recovered. Particularly, the color red is oftentimes not sufficiently sharp or vivid enough when expressed in a colored image. Therefore, how to enable a projector to possess sufficient displaying luminance while ensuring true recovery of colors is a key issue that projector manufacturers are faced with in designing products, and color wheel design is the most important factor.

Referring to FIG. 1, a conventional six-segment color wheel is designed to have three non-primary colors, e.g., white (W), yellow (Y) and cyan (C), in addition to the three primary colors of red (R), green (G), and blue (B). To make the best use of the color wheel and to enhance the utilization efficiency of the color wheel, a projector will mix the three primary colors having suitable color levels to produce other non-primary colors. In this way, one revolution of the color wheel will produce two non-primary color lights of the same color, so that the projector has sufficient displaying luminance and the colors can be more truly recovered. Therefore, the color level values of the three primary colors to produce the other non-primary colors need to be recorded in the projector.

One conventional way to determine the color level values of the three primary colors is to divide each non-primary color zone of the color wheel into a plurality of sub-color blocks, e.g., dividing the yellow color zone into sub-color blocks Y1, Y2, Y3, and Y4, and projecting the color of one of the sub-color blocks, e.g., Y1, and a combination of the three primary colors that have suitable color level values onto left and right halves of a screen (i.e., side by side), respectively. Subsequently, the color level values of the three primary colors are adjusted through naked eye inspection and with the aid of a color adjusting tool, CIE xy (color calibration software loaded in a computer connected to the projector). The color level values of the three primary colors are adjusted until the color produced on the screen by the combination of the three primary colors having certain color level values matches the color of the sub-color block Y1. The projector is then caused to record the color level values of the three primary colors last adopted by the projector. The above steps are subsequently repeated for the rest of the sub-color blocks Y1, Y2, Y3, and Y4 until corresponding color level values of the three primary colors are obtained for all of the sub-color blocks Y1, Y2, Y3, and Y4. The above steps are further repeated to determine the corresponding color level values of the three primary colors for the sub-color blocks of the other non-primary colors, e.g., sub-color blocks W1, W2, W3, and W4 of the color white, and sub-color blocks C1, C2, C3, and C4 of the color cyan.

However, the use of naked eye inspection to determine the corresponding color level values of the three primary colors for the sub-color blocks of each non-primary color is not only time-consuming but also inaccurate.

SUMMARY OF THE INVENTION

Therefore, an object of the present invention is to provide a method and system for automatic color wheel calibration in a projector so as to reduce operating time and enhance calibration accuracy.

In the method for automatic color wheel calibration in a projector according to the present invention, the color wheel includes three primary colors and a non-primary color. The method comprises:

(A) enabling the projector to project the non-primary color of the color wheel, and measuring first optical physical amounts $X_r$, $Y_r$, and $Z_r$ of the projected non-primary color;

(B) enabling the projector to project a color formed by a combination of the three primary colors of the color wheel which have respective color level values $R_n$, $G_n$, and $B_n$, and measuring second optical physical amounts $X_m$, $Y_m$, and $Z_m$ of the projected color of the combination;

(C) according to difference values $\Delta X$, $\Delta Y$, and $\Delta Z$ of respective differences between the first optical physical amounts $X_r$, $Y_r$, and $Z_r$ and the second optical physical amounts $X_m$, $Y_m$, and $Z_m$, adjusting the respective color level values $R_n$, $G_n$, and $B_n$ of the three primary colors; and (D) repeating steps (B) and (C) until each of the difference values $\Delta X$, $\Delta Y$, and $\Delta Z$ approximates zero.

Preferably, in step (C), new color level values $R_{n+1}$, $G_{n+1}$, and $B_{n+1}$ are generated for the three primary colors, and the new color level values $R_{n+1}$, $G_{n+1}$, and $B_{n+1}$ are compared with the color level values $R_{n-1}$, $G_{n-1}$, and $B_{n-1}$ previously used by the projector to determine if they are identical, and if not, the new color level values $R_{n+1}$, $G_{n+1}$ and $B_{n+1}$ are sent to the projector as the color level values $R_n$, $G_n$, and $B_n$ of the three primary colors, and if so, the projector is caused to record the respective color level values $R_n$, $G_n$, and $B_n$ currently used thereby.

Preferably, in step (D), when the new color level values $R_{n+1}$, $G_{n+1}$, and $B_{n+1}$ generated in step (C) are identical to the color level values $R_{n-1}$, $G_{n-1}$, and $B_{n-1}$ previously used by the projector, it is determined that each of the difference values $\Delta X$, $\Delta Y$, and $\Delta Z$ approximates zero.

Preferably, in step (C), the new color level values $R_{n+1}$, $G_{n+1}$, and $B_{n+1}$ are generated by:

(C1) determining if the absolute value of $\Delta X$ is greater than the absolute value of each of $\Delta Y$ and $\Delta Z$, and if so, determining if $\Delta X$ is greater than zero, and letting $R_{n+1}=R_n+1$ if $\Delta X$ is greater than zero, and letting $R_{n+1}=R_n-1$ if $\Delta X$ is not greater than zero;

(C2) determining if the absolute value of $\Delta Y$ is greater than the absolute value of each of $\Delta X$ and $\Delta Z$, and if so, determining if $\Delta Y$ is greater than zero, and letting $G_{n+1}=G_n+1$ if $\Delta Y$ is greater than zero, and letting $G_{n+1}=G_n-1$ if $\Delta Y$ is not greater than zero; and (C3) determining if the absolute value of $\Delta Z$ is greater than the absolute value of each of $\Delta X$ and $\Delta Y$, and if so, determining if ΔZ is greater than zero, and letting $B_{n+1}=B_n+1$ if ΔZ is greater than zero, and letting $B_{n+1}=B_n-1$ if ΔZ is not greater than zero.

Furthermore, the system for automatic color wheel calibration in a projector which is adopted by the present invention to implement the aforesaid method comprises:

a projector including a color wheel, the color wheel including three primary colors and a non-primary color, the projector projecting the non-primary color and a color formed by a combination of the three primary colors of the color wheel which have respective color level values $R_n$, $G_n$, and $B_n$;

a color meter for measuring first optical physical amounts $X_r$, $Y_r$, and $Z_r$ of the projected non-primary color, and second optical physical amounts $X_m$, $Y_m$, and $Z_m$ of the projected color formed by the combination of the three primary colors having the respective color level values $R_n$, $G_n$, and $B_n$; and a computer coupled to the projector and the color meter and operable to execute the following steps:

(A) according to difference values ΔX, ΔY, and ΔZ of respective differences between the first optical physical amounts $X_r$, $Y_r$, and $Z_r$ and the second optical physical amounts $X_m$, $Y_m$, and $Z_m$, adjusting the respective color level values $R_n$, $G_n$, and $B_n$ of the three primary colors;

(B) enabling the projector to project a color formed by a combination of the three primary colors of the color wheel whose color level values were adjusted in step (A), and enabling the color meter to measure the second optical physical amounts $X_m$, $Y_m$, and $Z_m$ of the projected color of the combination; and (C) repeating steps (A) and (B) until each of the difference values ΔX, ΔY, and ΔZ approximates zero.

According to the present invention, the projector projects a non-primary color of the color wheel for measurement of the first optical physical amounts $X_r$, $Y_r$, and $Z_r$ of the projected non-primary color by the color meter, and further projects a color formed by a combination of the three primary colors of the color wheel which have respective color level values $R_n$, $G_n$, and $B_n$ for measurement of the second optical physical amounts $X_m$, $Y_m$, and $Z_m$ of the projected color of the combination by the color meter. The computer then automatically adjusts the respective color level values $R_n$, $G_n$, and $B_n$ of the three primary colors according to difference values ΔX, ΔY, and ΔZ of respective differences between the first optical physical amounts $X_r$, $Y_r$, and $Z_r$ and the second optical physical amounts $X_m$, $Y_m$, and $Z_m$, and provides the adjusted color level values $R_n$, $G_n$, and $B_n$ of the three primary colors to the projector for projection of a combination color. The computer continues to adjust the respective color level values $R_n$, $G_n$, and $B_n$ of the three primary colors according to difference values ΔX, ΔY, and ΔZ of respective differences between newly measured second optical physical amounts $X_m$, $Y_m$, and $Z_m$ and the first optical physical amounts $X_r$, $Y_r$, and $Z_r$ so that the color level values $R_n$, $G_n$, and $B_n$ of the three primary colors gradually converge until they correspond to the non-primary color to be matched, thereby achieving the objectives of automatically finding the respective color level values of the three primary colors for each non-primary color, reducing operating time, and enhancing calibration accuracy.

BRIEF DESCRIPTION OF THE DRAWINGS

Other features and advantages of the present invention will become apparent in the following detailed description of the preferred embodiment with reference to the accompanying drawings, of which:

FIG. 2 is a schematic diagram to illustrate the preferred embodiment of a system for automatic color wheel calibration in a projector according to the present invention;

DETAILED DESCRIPTION OF THE PREFERRED EMBODIMENT

FIG. 2 illustrates the preferred embodiment of a system for automatic color wheel calibration in a projector according to the present invention. To realize a method for automatic color wheel calibration in a projector according to the present invention, the system according to the preferred embodiment comprises a projector 1, a personal computer 2, and a color meter 3. The method according to the preferred embodiment is mainly applied during the development of products at the research and development stage or during calibration of colors of color wheels on production lines at the production stage. Therefore, the technical contents to be described hereinafter are related to the process of color wheel calibration in a projector and are not related to normal use of a projector.

Figure 1:
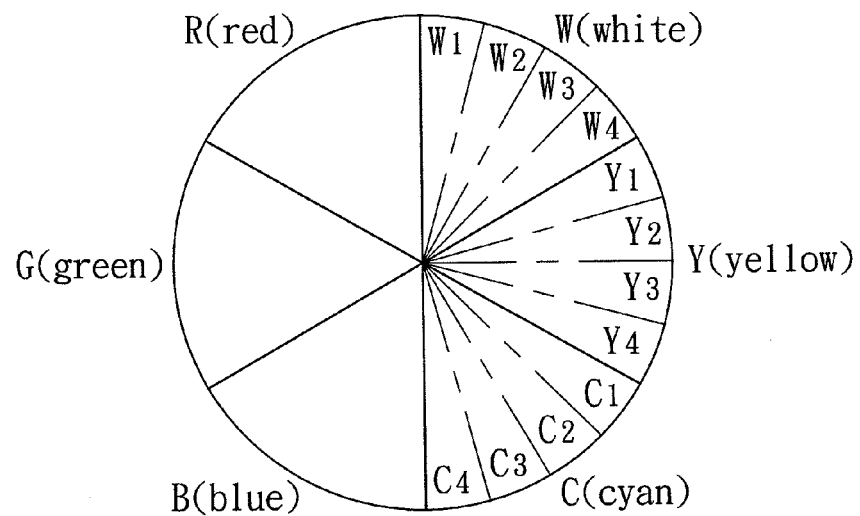
FIG. 1 is a schematic diagram of a conventional six-segment color wheel.

The projector 1 according to the preferred embodiment is exemplified as a DLP projector using a single DMD chip, and includes a six-segment color wheel (not limited thereto in other embodiments of this invention) as shown in FIG. 1. Since the non-primary colors of the color wheel are not homogeneous (i.e., the color distribution is not uniform), each of non-primary color zones, e.g., the yellow zone, is pre-divided into a plurality of sub-color blocks, e.g., Y1, Y2, Y3, and Y4, and respective color level values of the three primary colors for forming a combination color corresponding to each of the sub-color blocks are subsequently found. The projector 1 projects the colors of the sub-color blocks one at a time onto a screen 4, and projects the three primary colors onto the screen 4 according to the color level values $R_n$, $G_n$, and $B_n$ of the three primary colors (which combine to form a color that usually approximates the color of the sub-color block) provided by the personal computer 2, such that the combination of the three primary colors as presented approximates the color of the sub-color block projected on the screen 4.

The color meter 3 in this embodiment is a CL-200 of Konica Minolta (which is commonly used to measure colors), and is connected to the personal computer 2 for measuring first optical physical amounts $X_r$, $Y_r$, and $Z_r$ generated by the color of the sub-color block, e.g., Y1, projected on the screen 4, and second optical physical amounts $X_m$, $Y_m$, and $Z_m$ of the color produced on the screen 4 by the combination of the three primary colors having the respective color level values $R_n$, $G_n$, and $B_n$, and for sending the first and second optical physical amounts $X_r$, $Y_r$, $Z_r$ and $X_m$, $Y_m$, $Z_m$ to the personal computer 2. Since the optical physical amounts measured using the color meter 3 specify luminance and chromaticity information of the colors, compared to the conventional color calibration software tool of CIE xy which only provides chromaticity information of colors, use of the color meter 3 to find the most suitable color level values for the three primary colors during the process of matching a color produced by a combination of the three primary colors having respective color level values to the color of a sub-color block can achieve more accurate color calibration.

The personal computer 2 is connected to the projector 1 for providing the color level values $R_n$, $G_n$, and $B_n$ of the three primary colors to the projector 1, calculates difference values $\Delta X$, $\Delta Y$, and $\Delta Z$ of respective differences between the first optical physical amounts $X_r$, $Y_r$, and $Z_r$ and the second optical physical amounts $X_m$, $Y_m$, and $Z_m$, adjusts the color level values $R_n$, $G_n$, and $B_n$ of the three primary colors according to the difference values $\Delta X$, $\Delta Y$, and $\Delta Z$, and sends the color level values thus adjusted to the projector 1 to serve as a basis for projecting the combination of the three primary colors. Subsequently, the personal computer 2 calculates difference values $\Delta X$, $\Delta Y$, and $\Delta Z$ between the first optical physical amounts $X_r$, $Y_r$, and $Z_r$ and the second optical physical amounts $X_m$, $Y_m$, and $Z_m$ that are newly measured with the use of the color meter 3, and adjusts the color level values $R_n$, $G_n$, and $B_n$ of the three primary colors anew according to the newly obtained difference values $\Delta X$, $\Delta Y$, and $\Delta Z$. By repeating the above operations, the personal computer 2 can cause the color level values $R_n$, $G_n$, and $B_n$ of the three primary colors to converge until the color formed by the combination of the three primary colors is identical (or almost identical) to that of the sub-color block, e.g., Y1, and each of the difference values $\Delta X$, $\Delta Y$, and $\Delta Z$ approximates zero, thereby obtaining color level values for the three primary colors to form a combination color which is closest to that of the sub-color block, e.g., Y1. The color level values thus obtained are recorded in the projector 1 for future use in controlling the color wheel to produce the color of the corresponding sub-color block of a non-primary color using the three primary colors having the color level values thus recorded.

The calibration process for the sub-color blocks of each non-primary color according to the preferred embodiment, i.e., finding the color level values of the three primary colors corresponding to each of the sub-color blocks of each of the non-primary colors, will be further described in detail in the succeeding paragraphs.

Referring to FIG. 1, the preferred embodiment will be illustrated by way of an example in which color level values of the three primary colors which correspond to a sub-color block of a non-primary color of the color wheel, e.g., yellow, are found. Initially, the yellow zone is divided into four sub-color blocks Y1, Y2, Y3, and Y4. Color level values of the three primary colors corresponding to the four sub-color blocks Y1, Y2, Y3, and Y4 are found sequentially through the preferred embodiment of this invention.

Figure 3:
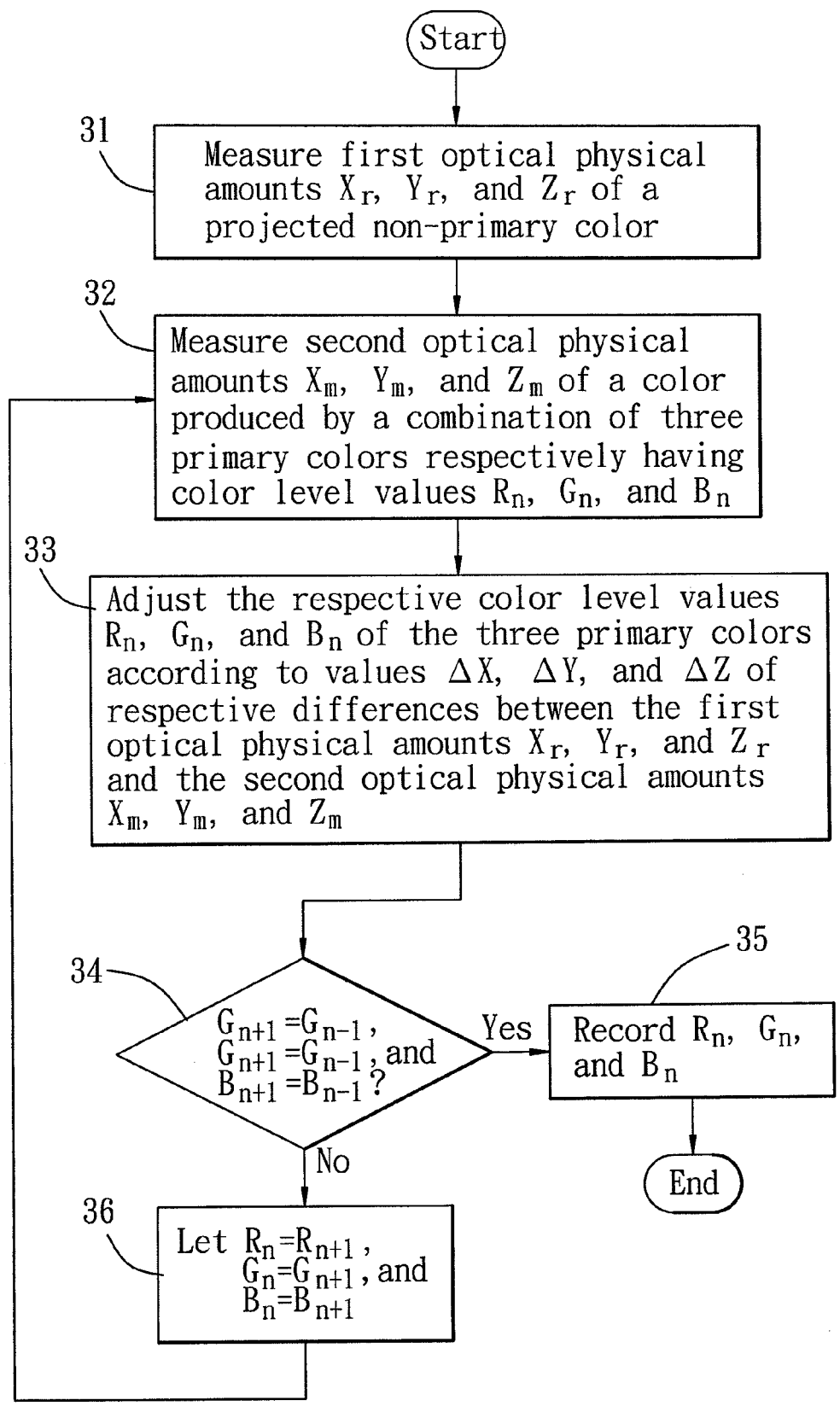
FIG. 3 is a flowchart to illustrate the preferred embodiment of a method for automatic color wheel calibration in a projector according to the present invention.

Referring to FIGS. 2 and 3, in step 31, the personal computer 2 enables the projector 1 to project the color of the sub-color block Y1 onto the screen 4, and the color meter 3 is enabled to measure first optical physical amounts $X_r$, $Y_r$, and $Z_r$ of the color presented on the screen 4 by the sub-color block Y1, and sends the first optical physical amounts $X_r$, $Y_r$, and $Z_r$ thus measured to the personal computer 2.

Subsequently, in step 32, the personal computer 2 provides color level values $R_n$, $G_n$, and $B_n$ of the three primary colors for forming a color approximating yellow to the projector 1, and enables the projector 1 to project a color formed by a combination of the three primary colors of the color wheel according to the color level values $R_n$, $G_n$, and $B_n$ onto the screen 4. The color meter 3 is enabled to measure second optical physical amounts $X_m$, $Y_m$, and $Z_m$ of the color (approximating yellow) produced by the combination of the three primary colors having the color level values $R_n$, $G_n$, and $B_n$ and to send the second optical physical amounts $X_m$, $Y_m$, and $Z_m$ thus measured to the personal computer 2.

Thereafter, in step 33, the personal computer 2 adjusts the color level values $R_n$, $G_n$, and $B_n$ of the three primary colors through a software-based convergence algorithm and according to difference values $\Delta X$, $\Delta Y$, and $\Delta Z$ of respective differences between the first and second optical physical amounts $X_r$, $Y_r$, $Z_r$, and $X_m$, $Y_m$, $Z_m$. The flow of the convergence algorithm is detailed in FIG. 4. It is first noted herein that the color level values $R_n$, $G_n$, and $B_n$ as used herein refer to the color level values of the three primary colors currently used by the projector 1, that color level values $R_{n+1}$, $G_{n+1}$, and $B_{n+1}$ refer to the new color level values of the three primary colors generated by the personal computer 2, and that color level values $R_{n-1}$, $G_{n-1}$, and $B_{n-1}$ refer to the color level values of the three primary colors previously used by the projector 1.

First, in step 41, the difference values of respective differences $\Delta X$, $\Delta Y$, and $\Delta Z$ between the first optical physical amounts $X_r$, $Y_r$, and $Z_r$ and the second optical physical amounts $X_m$, $Y_m$, and $Z_m$ are calculated, i.e., $\Delta X = X_r - X_m$, $\Delta Y = Y_r - Y_m$, and $\Delta Z = Z_r - Z_m$. Next, in step 42, a determination is made as to whether the absolute value of $\Delta X$ is greater than the absolute value of each of $\Delta Y$ and $\Delta Z$. If yes, this indicates that the color level value $R_n$ has the greatest influence on the value of the second optical physical amount $X_m$, and needs to be adjusted first. Therefore, in step 43, a further determination is made to see if $\Delta X$ is greater than zero. If yes, this indicates that $R_n$ is relatively low. Then, in step 44, $R_n$ is increased, i.e., $R_{n+1} = R_n + 1$, while $G_n$ and $B_n$ remain unchanged, i.e., $G_{n+1} = G_n$, $B_{n+1} = B_n$. If no, this indicates that $R_n$ is relatively high, and in step 45, $R_n$ is decreased, i.e., $R_{n+1} = R_n - 1$, while $G_n$ and $B_n$ remain unchanged, i.e., $G_{n+1} = G_n$, $B_{n+1} = B_n$.

If the determination in step 42 is no, step 46 is executed to determine whether the absolute value of $\Delta Y$ is greater than the absolute value of each of $\Delta X$ and $\Delta Z$. If yes, this indicates that the color level value $G_n$ has the greatest influence on the value of the second optical physical amount $Y_m$, and needs to be adjusted first. Therefore, in step 47, it is further determined if $\Delta Y$ is greater than zero. If yes, this indicates that $G_n$ is relatively low. Then, in step 48, $G_n$ is increased, i.e., $G_{n+1} = G_n + 1$, while $R_n$ and $B_n$ remain unchanged, i.e., $R_{n+1} = R_n$, $B_{n+1} = B_n$. If no, this indicates that $G_n$ is relatively high. Then, in step 49, $G_n$ is decreased, i.e., $G_{n+1} = G_n - 1$, while $R_n$ and $B_n$ remain unchanged, i.e., $R_{n+1} = R_n$, $B_{n+1} = B_n$.

If the determination in step 46 is no, step 50 is executed to determine whether the absolute value of $\Delta Z$ is greater than the absolute value of each of $\Delta X$ and $\Delta Y$. If yes, this indicates that the color level value $B_n$ has the greatest influence on the value of the second optical physical amount $Z_m$, and needs to be adjusted first. Therefore, in step 51, it is further determined if $\Delta Z$ is greater than zero. If yes, this indicates that $B_n$ is relatively low. Then, in step 52, $B_n$ is increased, i.e., $B_{n+1} = B_n + 1$, while $R_n$ and $G_n$ remain unchanged, i.e., $R_{n+1} = R_n$, $G_{n+1} = G_n$. If no, this indicates that $B_n$ is relatively high. Then, in step 53, $B_n$ is decreased, i.e., $B_{n+1} = B_n - 1$, while $R_n$ and $G_n$ remain unchanged, i.e., $R_{n+1} = R_n$, $G_{n+1} = G_n$. If the determination in step 50 is no, this indicates that the calculation is incorrect, and the flow returns to step 41 to redo the calculation.

Figure 4:
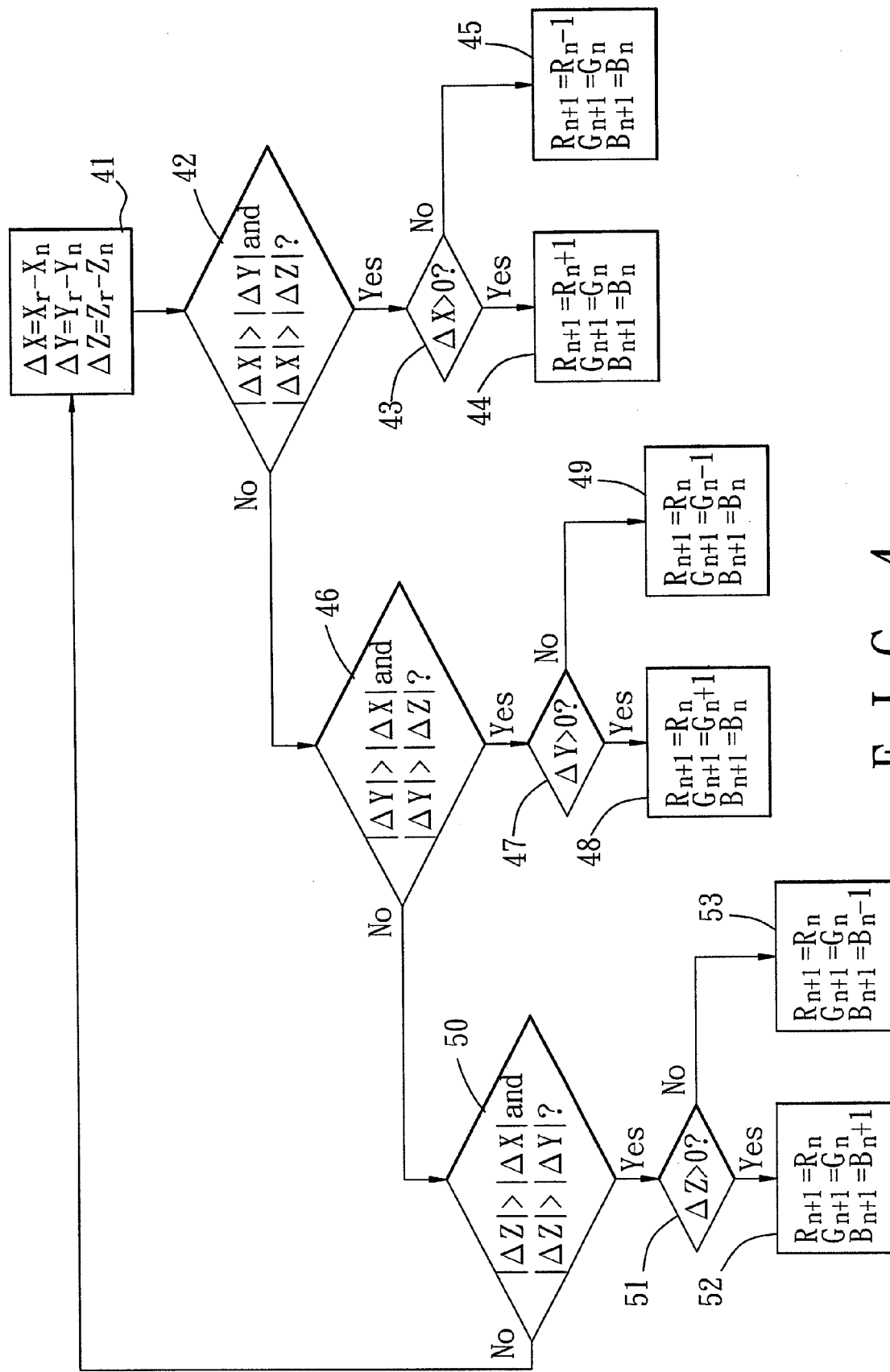
FIG. 4 is a flowchart to illustrate a convergence algorithm according to the preferred embodiment.

Therefore, after adjustment of the color level values according to FIG. 4, new color level values of the three primary colors, i.e., $R_{n+1}$, $G_{n+1}$, $B_{n+1}$, will be obtained.

Subsequently, in step 34, it is determined whether the new color level values of $R_{n+1}$, $G_{n+1}$, and $B_{n+1}$ are identical to the color level values $R_{n-1}$, $G_{n-1}$, and $B_{n-1}$ that were adopted by the projector 1 in the previous operation. If the color level values $R_{n+1}$, $G_{n+1}$, and $B_{n+1}$ were generated from the first adjustment, the determination in step 34 does not apply, and the flow goes to step 36. In step 36, the personal computer 2 takes the new color level values $R_{n+1}$, $G_{n+1}$, and $B_{n+1}$ as the current color level values $R_n$, $G_n$, and $B_n$ of the three primary colors, sends the same to the projector 1, and enables the projector 1 to project the three primary colors on the screen 4 having the current color level values $R_n$, $G_n$, and $B_n$. Thereafter, step 32 is repeated to enable the color meter 3 to measure the second optical physical amounts $X_m$, $Y_m$, and $Z_m$ of the color generated by a combination of the three primary colors having the respective color level values $R_n$, $G_n$, and $B_n$ obtained in step 36. Then, in step 33, the color level values $R_n$, $G_n$, and $B_n$ of the three primary colors are re-adjusted according to difference values of respective differences $\Delta X$, $\Delta Y$, and $\Delta Z$ between the first optical physical amounts $X_r$, $Y_r$, and $Z_r$, and the newly measured second optical physical amounts $X_m$, $Y_m$, and $Z_m$. After a determination is made in step 34, the adjusted color level values $R_n$, $G_n$, and $B_n$ are sent to the projector 1 in step 36. Thus, by repeating the above steps 32, 33, 34, and 36, the color level values $R_n$, $G_n$, and $B_n$ of the three primary colors are gradually converged so that the color generated by a combination of the three primary colors gets closer and closer to the color of the yellow sub-color block Y1 to be matched, and so that each of the difference values $\Delta X$, $\Delta Y$, and $\Delta Z$ is gradually converged to zero or at least to approximately zero. In other words, after repeating steps 32, 33, 34 and 36 a number of times (at least three times), when it is determined that the newly generated color level values $R_{n+1}$, $G_{n+1}$, and $B_{n+1}$ are identical to the color level values $R_{n-1}$, $G_{n-1}$, and $B_{n-1}$ previously used by the projector 1, this indicates that the color level values $R_n$, $G_n$, and $B_n$ currently used by the projector 1 have been converged to ones that are closest to the color of the yellow sub-color block to be matched. Therefore, step 35 is executed to enable the projector 1 to record the currently used color level values $R_n$, $G_n$, and $B_n$.

Accordingly, through repeating the above process, the personal computer 2 can automatically find color level values of the three primary colors corresponding to each of the sub-color blocks of a non-primary color and record the same in the projector 1. Hence, the projector 1 not only can project a desired color using a non-primary color block, e.g., a certain sub-color block of the color yellow, it can also produce a color identical to that of the yellow sub-color block using a combination of the three primary colors having the corresponding color level values. Thus, utilization of the color wheel is enhanced, and the projector 1 can project colors with increased displaying luminance and truer color recovery.

In sum, according to this embodiment, the projector 1 projects a non-primary color of the color wheel onto the screen 4 for measurement of the first optical physical amounts $X_r$, $Y_r$, and $Z_r$ of the projected non-primary color by the color meter 3, and further projects a color formed by a combination of the three primary colors of the color wheel which have respective color level values $R_n$, $G_n$, and $B_n$ for measurement of the second optical physical amounts $X_m$, $Y_m$, and $Z_m$ of the projected color of the combination by the color meter 3. The personal computer 2 then automatically adjusts the respective color level values $R_n$, $G_n$, and $B_n$ of the three primary colors according to difference values $\Delta X$, $\Delta Y$, and $\Delta Z$ of respective differences between the first optical physical amounts $X_r$, $Y_r$, and $Z_r$ and the second optical physical amounts $X_m$, $Y_m$, and $Z_m$, and provides the adjusted color level values $R_n$, $G_n$, and $B_n$ of the three primary colors to the projector 1 for projection of a combination color. The personal computer 2 continues to adjust the respective color level values $R_n$, $G_n$, and $B_n$ of the three primary colors according to difference values $\Delta X$, $\Delta Y$, and $\Delta Z$ of respective differences between newly measured second optical physical amounts $X_m$, $Y_m$, and $Z_m$ and the first optical physical amounts $X_r$, $Y_r$ and $Z_r$ so that the color level values $R_n$, $G_n$, and $B_n$ of the three primary colors gradually converge until they correspond to the non-primary color to be matched, thereby achieving the objectives of automatically finding the respective color level values of the three primary colors for each of the non-primary color blocks, reducing operating time, and enhancing calibration accuracy.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for automatic color wheel calibration in a projector, the color wheel including three primary colors and a non-primary color, said method comprising:
   (A) enabling the projector to project the non-primary color of the color wheel, and measuring, by a color meter, first optical physical amounts $X_r$, $Y_r$ and $Z_r$ of the projected non-primary color;
   (B) enabling the projector to project a color formed by a combination of the three primary colors of the color wheel which have respective color level values $R_n$, $G_n$, and $B_n$, and measuring, by the color meter, second optical physical amounts $X_m$, $Y_m$, and $Z_m$ of the projected color of the combination;
   (C) determining, by a computer device, difference values $\Delta X$, $\Delta Y$ and $\Delta Z$ of respective differences between the first optical physical amounts $X_r$, $Y_r$ and $Z_r$ and the second optical physical amounts $X_m$, $Y_m$, and $Z_m$, adjusting, by the computer device, the respective color level values $R_n$, $G_n$, $B_n$ of the three primary colors; and
   (D) repeating steps (B) and (C) until the computer device determines that each of the difference values $\Delta X$, $\Delta Y$ and $\Delta Z$ approximates zero.

2. The method for automatic color wheel calibration in a projector according to claim 1, wherein, in step (C), new color level values $R_{n+1}$, $G_{n+1}$ and $B_{n+1}$ are generated, by the computer device, for the three primary colors, and the new color level values $R_{n+1}$, $G_{n+1}$ and $B_{n+1}$ are compared, by the computer device, with the color level values $R_{n-1}$, $G_{n-1}$ and $B_{n-1}$ previously used by the projector to determine if they are identical, and if not, the new color level values $R_{n+1}$, $G_{n+1}$ and $B_{n+1}$ are sent, by the computer device, to the projector as the color level values $R_n$, $G_n$, $B_n$ of the three primary colors, and if so, the projector is caused, by the computer device, to record the respective color level values $R_n$, $G_n$, and $B_n$ currently used thereby.

3. The method for automatic color wheel calibration in a projector according to claim 2, wherein, in step (D), when the new color level values $R_{n+1}$, $G_{n+1}$ and $B_{n+1}$ generated in step (C) are identical to the color level values $R_{n-1}$, $G_{n-1}$ and $B_{n-1}$ previously used by the projector, it is determined that each of the difference values $\Delta X$, $\Delta Y$ and $\Delta Z$ approximates zero.

4. The method for automatic color wheel calibration in a projector according to claim 2, wherein, in step (C), the computer device generates the new color level values $R_{n+1}$, $G_{n+1}$ and $B_{n+1}$ by:
   (C1) determining if the absolute value of $\Delta X$ is greater than the absolute value of each of $\Delta Y$ and $\Delta Z$, and if so, determining if $\Delta X$ is greater than zero, and letting $R_{n+1} = R_n + 1$ if $\Delta X$ is greater than zero, and letting $R_{n+1} = R_n - 1$ if $\Delta X$ is not greater than zero;
   (C2) determining if the absolute value of $\Delta Y$ is greater than the absolute value of each of $\Delta X$ and $\Delta Z$, and if so, determining if $\Delta Y$ is greater than zero, and letting $G_{n+1} = G_n + 1$ if $\Delta Y$ is greater than zero, and letting $G_{n+1} = G_n - 1$ if $\Delta Y$ is greater than zero; and
   (C3) determining if the absolute value of $\Delta Z$ is greater than the absolute value of each of $\Delta X$ and $\Delta Y$, and if so, determining if $\Delta Z$ is greater than zero, and letting $B_{n+1}=B_n+1$ if $\Delta Z$ is greater than zero, and letting $B_{n+1}=B_n-1$ if $\Delta Z$ is not greater than zero.

5. The method for automatic color wheel calibration in a projector according to claim 1, wherein the color wheel includes a non-primary color zone that is divided into a plurality of non-primary color blocks, the non-primary color being the color of one of the non-primary color blocks.

6. A system for automatic color wheel calibration in a projector, comprising:
a projector including a color wheel, said color wheel including three primary colors and a non-primary color, said projector projecting the non-primary color and a color formed by a combination of the three primary colors of the color wheel which have respective color level values $R_n$, $G_n$, $B_n$;
a color meter for measuring first optical physical amounts $X_r$, $Y_r$ and $Z_r$ of the projected non-primary color, and second optical physical amounts $X_m$, $Y_m$, and $Z_m$ of the projected color formed by the combination of the three primary colors having the respective color level values $R_n$, $G_n$, and $B_n$; and
a computer coupled to said projector and said color meter and operable to execute the following steps:
(A) according to difference values $\Delta X$, $\Delta Y$ and $\Delta Z$ of respective differences between the first optical physical amounts $X_r$, $Y_r$ and $Z_r$ and the second optical physical amounts $X_m$, $Y_m$, and $Z_m$, adjusting the respective color level values $R_n$, $G_n$, and $B_n$ of the three primary colors;
(B) enabling said projector to project a color formed by a combination of the three primary colors of the color wheel whose color level values were adjusted in step (A), and enabling said color meter to measure the second optical physical amounts $X_m$, $Y_m$, and $Z_m$ of the projected color of the combination; and
(C) repeating steps (A) and (B) until each of the difference values $\Delta X$, $\Delta Y$ and $\Delta Z$ approximates zero.

7. The system for automatic color wheel calibration in a projector according to claim 6, wherein, in step (A), new color level values $R_{n+1}$, $G_{n+1}$ and $B_{n+1}$ are generated for the three primary colors, and are respectively compared with color level values $R_{n-1}$, $G_{n-1}$ and $B_{n-1}$ previously used by said projector to determine if they are identical, and if not, the new color level values $R_{n+1}$, $G_{n+1}$ and $B_{n+1}$ are sent to said projector to serve as the color level values $R_n$, $G_n$, and $B_n$ of the three primary colors to be projected by said projector, and if so, said projector is enabled to record the color level values $R_n$, $G_n$, and $B_n$ of the three primary colors currently used thereby.

8. The system for automatic color wheel calibration in a projector according to claim 7, wherein, in step (C), the difference values $\Delta X$, $\Delta Y$ and $\Delta Z$ are each determined to approximate zero when the new color level values $R_{n+1}$, $G_{n+1}$ and $B_{n+1}$ of the three primary colors are identical to the color level values $R_{n-1}$, $G_{n-1}$ and $B_{n-1}$ previously used by said projector.

9. The system for automatic color wheel calibration in a projector according to claim 7, wherein, in step (A), the new color level values $R_{n+1}$, $G_{n+1}$ and $B_{n+1}$ are generated by:
(A1) determining if the absolute value of $\Delta X$ is greater than the absolute value of each of $\Delta Y$ and $\Delta Z$, and if so, determining if $\Delta X$ is greater than zero, and letting $R_{n+1}=R_n+1$ if $\Delta X$ is greater than zero, and letting $R_{n+1}=R_n-1$ if $\Delta X$ is not greater than zero;
(A2) determining if the absolute value of $\Delta Y$ is greater than the absolute value of each of $\Delta X$ and $\Delta Z$, and if so, determining if $\Delta Y$ is greater than zero, and letting $G_{n+1}=G_n+1$ if $\Delta Y$ is greater than zero, and letting $G_{n+1}=G_n-1$ if $\Delta Y$ is not greater than zero; and
(A3) determining if the absolute value of $\Delta Z$ is greater than the absolute value of each of $\Delta X$ and $\Delta Y$, and if so, determining if $\Delta Z$ is greater than zero, and letting $B_{n+1}=B_n+1$ if $\Delta Z$ is greater than zero, and letting $B_{n+1}=B_n-1$ if $\Delta Z$ is not greater than zero.

10. The system for automatic color wheel calibration in a projector according to claim 6, wherein said color wheel includes at least one non-primary color zone that is divided into a plurality of non-primary color blocks, the non-primary color being the color of one of the non-primary color blocks.

* * * * *